Oct. 6, 1931.  S. C. HALVERSEN  1,826,130
FRONT WHEEL DRIVE MECHANISM FOR VEHICLES
Filed Dec. 2, 1930
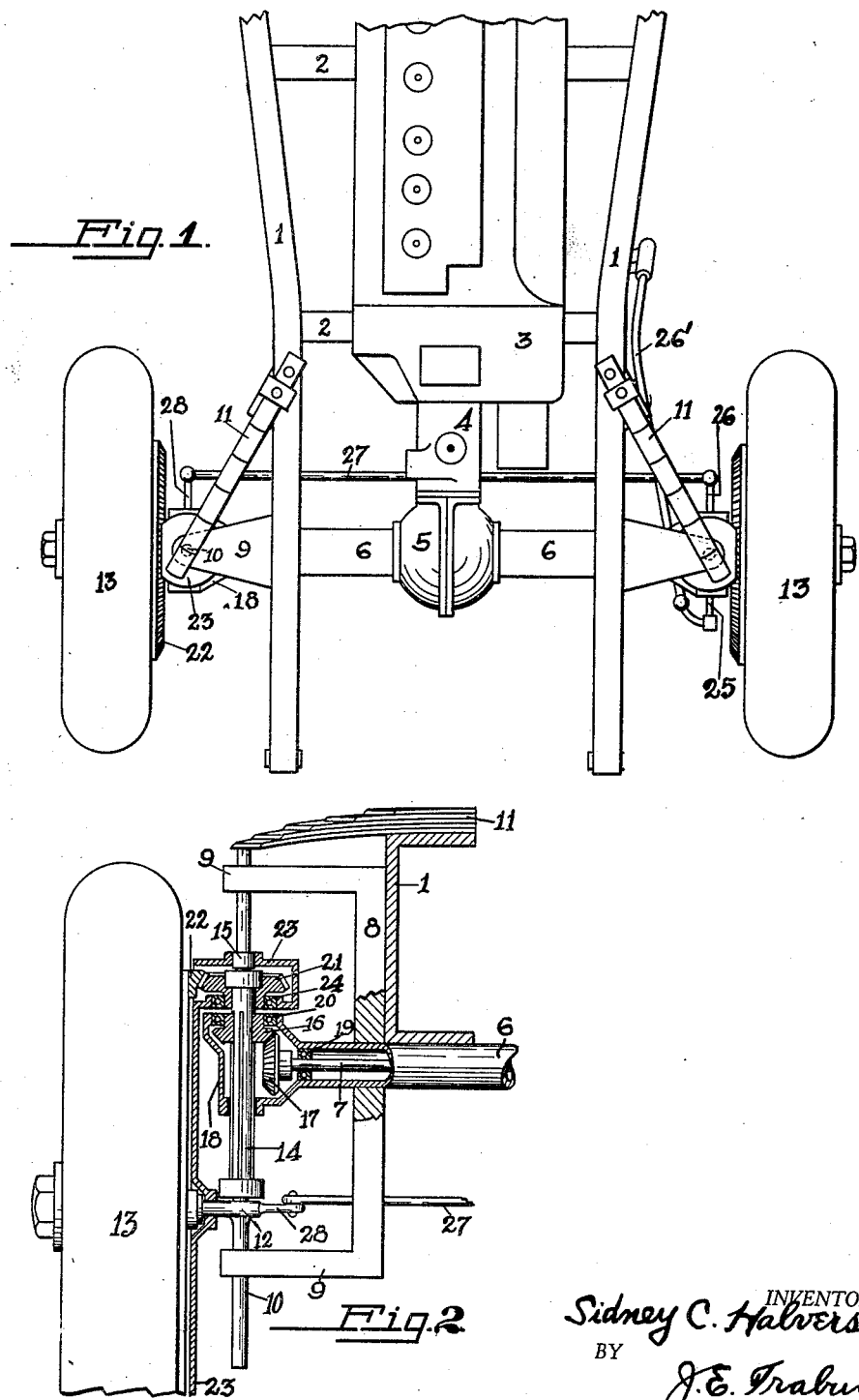

Patented Oct. 6, 1931

1,826,130

UNITED STATES PATENT OFFICE

SIDNEY C. HALVERSEN, OF SAN FRANCISCO, CALIFORNIA

FRONT WHEEL DRIVE MECHANISM FOR VEHICLES

Application filed December 2, 1930. Serial No. 499,469.

This invention relates to an improved front wheel driving mechanism for vehicles.

An object of my invention is to provide an improved front wheel drive mechanism for vehicles, wherein novel means is embodied for transmitting power from an engine to the front wheels of the vehicle.

Another object of my invention is to provide improved front wheel driving mechanism for vehicles which embodies novel means for flexibly mounting the various parts thereof on the vehicle frame.

Other objects more or less apparent will present themselves or will be specifically pointed out in the description to follow;

In the accompanying drawings:

Fig. 1 is a plan view of a vehicle frame showing my improved front wheel driving mechanism mounted thereon; and Fig. 2 is a side view of the drive mechanism applied to one of the wheels, certain parts thereof being shown in vertical cross section.

Referring to the drawings the numeral 1 represents the side channel members of a vehicle frame having cross bars 2 secured thereto. Suitably mounted on and secured to the cross bars, is an engine 3 having a forwardly extending drive shaft which is connected in the usual manner to a transmission mechanism mounted in a transmission housing 4. The transmission mechanism is connected in the customary manner to a differential mechanism mounted in a differential housing 5, and the latter is secured to a transversely extending tubular housing 6 which surrounds a drive shaft 7. The drive shaft 7 is suitably connected to the differential mechanism and is rotated in the usual manner through the motive power developed in the engine and transmitted thereto. The tubular housing 6 extends through and is secured to suitable side brackets 8 which are provided at their ends with outwardly disposed parts 9. The side brackets 8 are secured as by welding to the side channel members 1 of the frame and the latter are also secured to the tubular housing 6 by any suitable means. Slidably extending through each of the outwardly disposed parts 9 of each of the brackets 8 is a vertical rod 10, the upper end of which serves to support an end of a leaf spring 11 which is suitably secured to the upper side of one of the channel members 1. Each of the rods 10 is provided with an outwardly extending part 12 which serves as an axle for mounting a front vehicle wheel 13. Slidably mounted on each of the rods 10 is a splined sleeve 14 which is suitably held in position on the rod by a flange 15 provided on the latter and by the outwardly extending part 12.

Suitably secured to the splined sleeve 14 is a gear 16 which rotates with the sleeve but is adapted to move upwardly and downwardly independently thereof. The gear 16 on the splined sleeve 14 is in mesh with a gear 17 secured to an end of the shaft 7, thereby providing means for transmitting power from the said shaft to the splined sleeve. The gears 16 and 17 are housed within a hollow extension 18 of the tubular housing 6, and suitable bearings 19 and 20 located in the tubular housing 6 and the said hollow extension serve to permit free operation of the shaft and gears without undue friction.

The upper end of each of the splined sleeves 14 is secured to a bevel gear 21 which is in mesh with a circular gear 22 suitably secured to the inner side of the front wheel 13. A housing 23 extending around the gears 21 and 22 are mounted on the outwardly disposed extension 12 of the rod 10, serves to prevent the undue accumulation of dust on the said parts. The housing 23 is provided with suitable bearings 24 within which the gear 21 rotates.

In order to provide means for steering the vehicle, I have secured forwardly and rearwardly extending bars 25 and 26 to the axle of one of the wheels. The bar 25 is connected through moveable connections to a steering rod 26' which is suitably connected to the steering wheel of the vehicle in the usual manner. The rearwardly extending bar 26 is movably connected by a transversely extending rod 27 and a bar 28 to the axle of the other front vehicle wheel. Thus by turning the steering wheel of the vehicle the rod 26' may be made to actuate the two front vehicle wheels through the various connections in the desired direction.

Upon motive power being delivered from the engine 3 to the driving shaft 7, the gears 17 at the ends thereof are made to rotate. The gears 17 being in mesh with the gears 16 on the splined sleeves 14, transmit rotary motion to the said sleeves. The gears 21 on the splined sleeves being in mesh with the circular gears 22 on the vehicle wheels 13, serve to transmit motion to the said wheels.

In the event the vehicle is jarred through the encountering of a vehicle wheel with a rough or uneven road, the wheels 13, their axles, the rods 10, the splined sleeve 14, and the housing 23 may move upwardly or downwardly irrespective of the shaft 7 and the gears 16 and 17. In such event the splined sleeves though still rotating, permit the gear 16 to slide upwardly or downwardly. The leaf springs 11 absorb any jar and tend to return the rods 10 and the wheels 13 to their normal positions when the latter are moved upwardly. Irrespective of the amount of movement of the wheels 13, their axles and the rods 10 in upward or downward directions, the gears 17 and 16 are always maintained in mesh with each other, thereby assuring the continued application of motive power to the wheels 13.

It is obvious to those skilled in the art that my improved front wheel drive may be embodied in other forms equally as efficient as that shown and described, so for this and other apparent reasons I desire my invention included broadly within the spirit of the appended claims.

Having described my invention what I claim is:

1. In a front wheel drive mechanism for vehicles, a vehicle frame, a bracket secured to the vehicle frame, a substantially upright rod moveably mounted on the bracket, an axle secured to the rod, a vehicle wheel mounted on the axle, a splined sleeve slidably mounted on the rod having a gear thereon which is adapted to move up and downwardly independently of the sleeve but which is adapted to rotate with the sleeve, a drive shaft for rotating the sleeve, having a gear thereon in mesh with the gear moveably mounted on the sleeve, and means associated with the sleeve and the vehicle wheel for transmitting rotary motion to the said wheel from the sleeve.

2. In a front wheel drive mechanism for vehicles, a vehicle wheel having a gear thereon, a substantially upright rod carrying an axle on which the vehicle wheel is mounted, a splined sleeve slidably mounted on the rod, a drive shaft having a gear thereon, a gear splined to the sleeve and in mesh with the gear on the shaft, the said gear being adapted to move upwardly or downwardly independently of the sleeve and a second gear fixed to the sleeve and in mesh with the gear on the vehicle wheel.

3. In a front wheel drive mechanism, a vehicle wheel with a gear thereon, a rod carrying an axle on which the wheel is mounted, a splined sleeve slidably mounted on the rod carrying a gear in mesh with the gear on the wheel, a drive shaft having a gear thereon, and a second gear on the sleeve in mesh with a gear on the drive shaft, the second gear being splined to the sleeve and adapted to move upwardly or downwardly independently of the sleeve.

4. In a front wheel drive mechanism for vehicles, a vehicle frame, a substantially upright rod moveably mounted on the vehicle frame, an axle provided on the rod, a vehicle wheel on the axle, a splined sleeve slidably mounted on the rod having a gear secured thereto, a gear secured to the vehicle wheel and in mesh with the gear on the sleeve, a drive shaft, and means associated with the sleeve and the drive shaft for transmitting rotary motion from the drive shaft to the sleeve.

5. In a front wheel drive mechanism for vehicles, a vehicle frame having a bracket and a spring secured thereto, a rod moveably mounted in the bracket having an end thereof in engagement with the spring, an axle on the rod, a vehicle wheel on the axle having a gear fixed thereto, a splined sleeve slidably mounted on the rod carrying a gear in mesh with the gear on the vehicle wheel, a drive shaft, and means associated with the drive shaft and the sleeve for transmitting rotary motion from the shaft to the sleeve.

In testimony whereof I have affixed my signature.

SIDNEY C. HALVERSEN.